Dec. 17, 1968  R. L. LEWIS  3,416,316
MASTER CYLINDER
Filed April 24, 1967  2 Sheets-Sheet 2

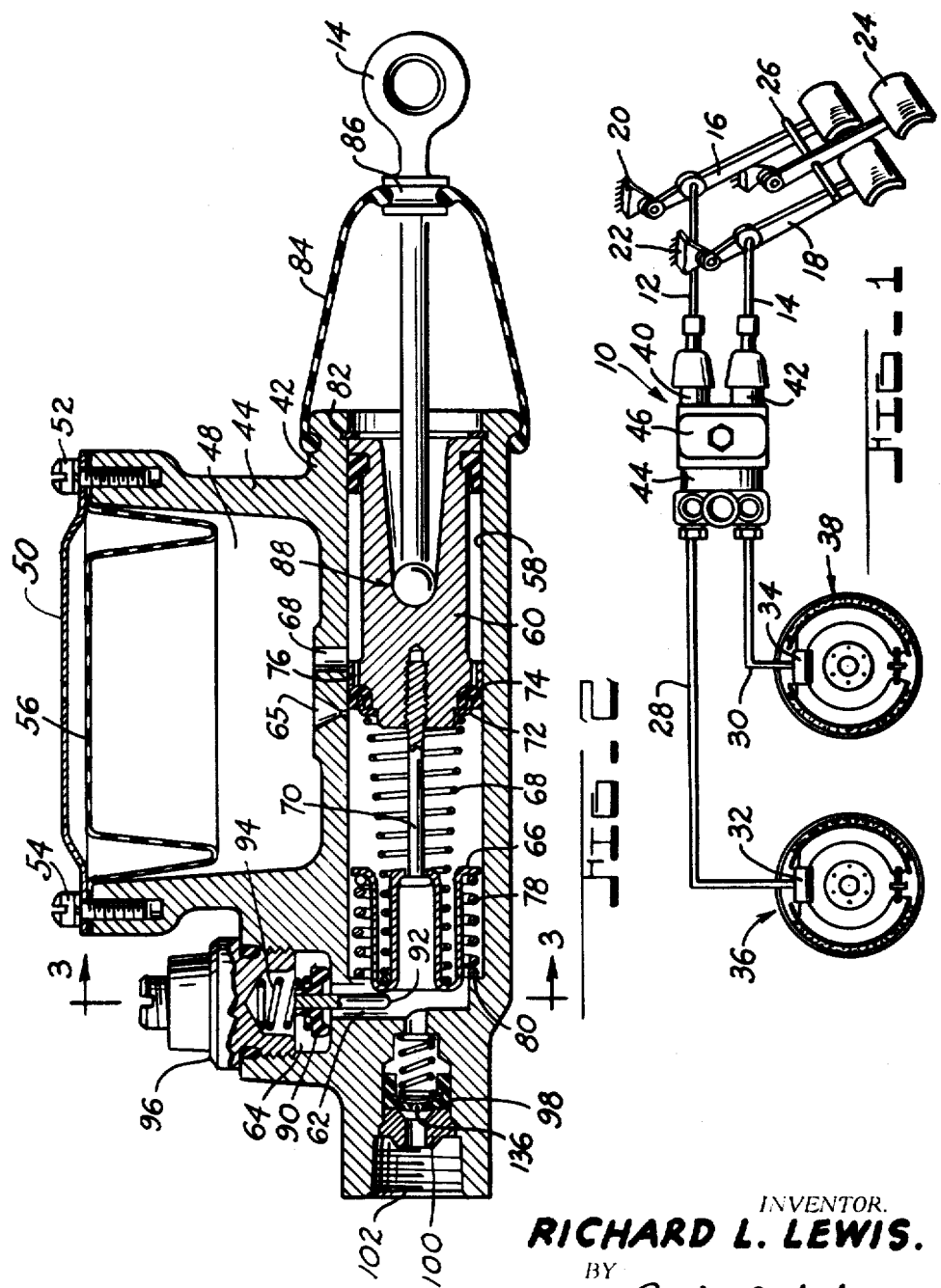

INVENTOR.
RICHARD L. LEWIS.
BY
ATTORNEY

United States Patent Office 3,416,316
Patented Dec. 17, 1968

3,416,316
MASTER CYLINDER
Richard L. Lewis, St. Joseph, Mich., assignor to The Bendix Corporation, a corporation of Delaware
Filed Apr. 24, 1967, Ser. No. 633,214
9 Claims. (Cl. 60—54.6)

ABSTRACT OF THE DISCLOSURE

A master cylinder having first and second pistons for developing separate pressures in separate chambers with first and second valve means operatively related to ports leading to said first and second chambers and to a common passage so as to equalize pressures in said first and second chambers whenever said first and second pistons are moved together.

SUMMARY OF THE INVENTION

Prior art devices of the type as improved by this invention have generally been employed in utilizing braking systems as steering means in addition to their function as decelerators of the associated vehicle.

It has been observed that in such prior art devices a problem of unequal pressure exists whenever the braking system is being employed to stop the vehicle in that it has been virtually impossible to equate the system pressures for the separate braking means when they are being simultaneously actuated.

It is a principal object of this invention to provide means for equating system pressures of separate braking systems when they are being actuated simultaneously which will permit the actuation of the separate braking systems independently for steering.

BRIEF DESCRIPTION OF THE DRAWINGS

FIGURE 1 is a schematic illustration of a braking system employing a master cylinder in accordance with the principles of this invention;

FIGURE 2 is a cross sectional view of the master cylinder taken through one bore thereof;

DETAILED DESCRIPTION

Figure 3:
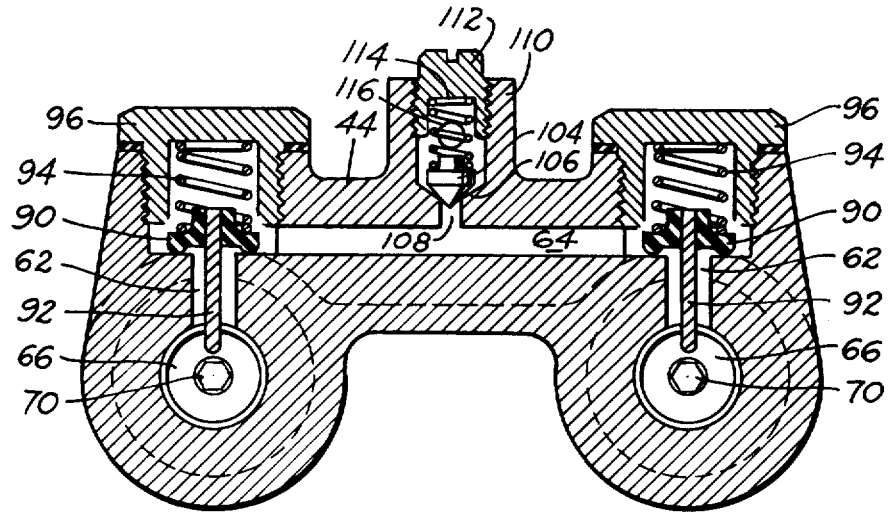
FIGURE 3 is a cross sectional end view of the master cylinder.

With reference now to FIGURE 1 there is shown a tandem master cylinder 10 actuatable by separate push rods 12 and 14 linked to brake pedals 16 and 18, respectively, which are pivoted to fixed brackets 20 and 22 of the associated vehicle. A common brake pedal 24 is also pivotally arranged in the vehicle and includes a rod 26 which, as seen, extends over the lever arms of the brake pedals 16 and 18 so that they may be simultaneously actuated. The master cylinder 10 is connected by means of conduits 28 and 30 to respective wheel cylinders 32 and 34 of right and left side brake means 36 and 38, respectively. The master cylinder 10 is constructed to comprise two cylinders 40 and 42 in one housing 44, and it has a reservoir chamber closed by a cap 46 for maintaining an adequate supply of hydraulic fluid for each of the cylinders 40 and 42.

The reservoir is more clearly seen in FIGURE 2 to comprise a cavity 48 in the housing structure 44 which is closed by a cap such as 46 or a cap 50 such as is shown in FIGURE 2 to be held to the housing by means of bolts 52 and 54 with a diaphragm seal 56 interposed. While the housing 44 is provided with two cylinders 40 and 42, the internal parts are the same, and, therefore, the construction shown by FIGURE 2 within the cylinder 42 will be duplicated in cylinder 40, whose internal parts will not be shown. As seen, the cylinder 42 is formed by boring the housing, as at 58, which bore is open through the housing 44. If desired, the housing could be cast to have the internal bores which are then thereafter machined to provide the desired finish prior to the assembly of the piston 60 within the bore 58. The bore 58 is opened by means of a passage 62 to a transverse passage 64 in the housing 44 and passages 65 and 68 are drilled to communicate the bore 58 to the reservoir cavity 48.

Prior to the assembly of the piston 60 within the cylinder 42 a spring retainer 66 and spring 68 are attached to the piston by a bolt 70 to form a caged spring assembly. The spring 68 bears upon a seal and spring retainer 72 for maintaining a lip seal 74 against a flange on the face of the piston 60, which is drilled, as at 76, to provide a plurality of spaced passages through the flange terminating at the seal 74 thereover. Upon assembly the piston and caged spring assembly are inserted into the bore 58 with a return spring 78 being compressed against a shoulder 80 of the housing 44 within the bore 58 until a snap ring 82 can be inserted into a groove in the end of the cylinder 42 forming a return stop for the piston 60, as urged by the spring 78. A rubber boot 84 is then snap fitted over the end of the cylinder 42 within a groove provided, which boot 84 also tightly fits within a recess 86 formed on the push rod 14 that is connected by a ball and socket joint as at 88 to the piston 60.

Next, a valve poppet 90 having a valve stem 92 passing through the passage 62 to terminate within the bore 58 is assembled at each end of the transverse passage 64 (see FIGURE 3) by placing the poppet over the opening of the passage 62 to the passage 64 and holding it onto the surface of the housing therearound by a spring 94, which extends between the poppet 90 and a plug 96 threaded to the housing to provide for valve installation and/or removal.

The other open end of the bore 58 is machined for the receipt of a spring-biased residual pressure check valve 98 held against a press fitted tube seat 100 underlying a threaded discharge port 102.

This construction is completed by assembling a relief valve 104 on a conical valve seat 106 about an opening 108 to the transverse passage 64 within a boss 110 of the housing 44, as by a plug 112. The spring 114 maintains the relief valve 104 on the seat 106 preventing, normally, communication of the passage 108 with a drilled passage 116 leading to the reservoir cavity 48 of the housing 44 for the master cylinder 10. The loading of the spring 114 by the plug 112 is such as to prevent fluid flow to the passage 108 into the reservoir during normal braking pressures and up to a predetermined maximum braking pressure.

Figure 4:
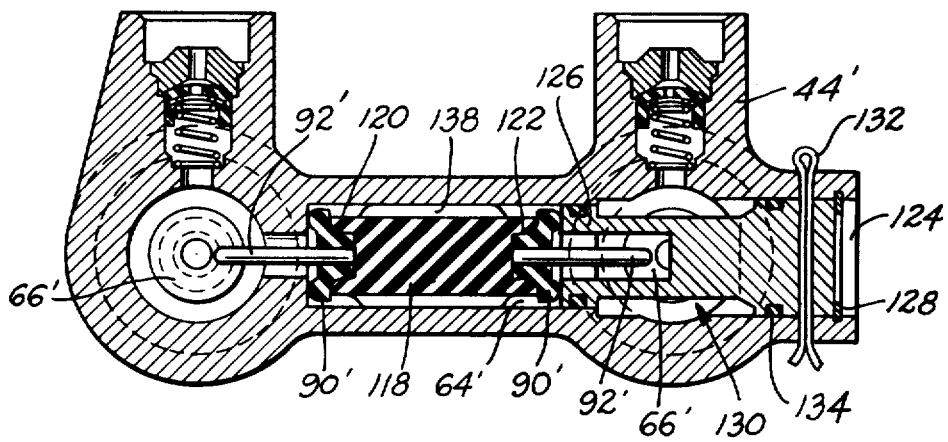
FIGURE 4 is a cross sectional end view of a modification to the valving means of the master cylinder to accomplish the end result of this invention.

With regard now to the structure of FIGURE 4, the relief valve structure may be eliminated by this design and it is possible to preclude damage during thermal expansion of fluid on the elements of the master cylinder necessary to equalize the pressures delivered. This is accomplished by means of a rubber column 118 which is snap fitted as at 120 and 122 to the poppets 90' which reduces the volume of the transverse passage 64' while permitting the flexing of the poppets 90' by the contact of the stems 92' thereof, as by the spring retainer 66' of the cage spring assembly attached to the pistons. The bulk modulus of the rubber is sufficient to permit fluid pressure relief by its volumetric compression.

Furthermore, it should be realized that the assembly of the poppets 90' is made much more practical and can be one via one opening 124 in the housing 44' of the master cylinder. A tubular plug 126 confines the poppet assembly comprising the poppets 90' and the rubber column 18 into the transverse bore or passage 64' of the master cylinder until a snap ring 128 can be fitted within a groove of the housing 44'. The tubular plug 126 is flattened along one side to permit the movement of the piston and the cage spring assembly, as at the area 130. It is prevented from rotating once it is assembled internally of the opening 124 through the housing 44' by a cotter pin 132. A seal 134 assembled in a groove of plug 126 maintains the integrity of the transverse bore 64' of the master cylinder.

OPERATION

Upon an operator depressing one or the other of the brake pedals 16 or 18, the respective piston 60 will be moved internally of the bore 58 to first close the compensating port 65 and thereafter translate the spring bearing plate 66 to come into contact with the valve stem 92 and thus tilt the valve poppet 90 off the housing 44 surrounding the opening of the passage 62 to the passage 64, as viewed in FIGURE 2. This will permit the pressure being developed ahead of the piston 60 to flow into the passage 64 as well as flow out the discharge port 102 via a central opening 136 of the residual pressure check valve 98. Upon release of the operator's pressure on the brake pedals 16 or 18 the return spring 78 will return the piston 60 to the released attitude shown in FIGURE 2 freeing the valve stem 92 from the spring bearing plate 66 so that the valve poppet 90 will once again close the communication of passage 62 to passage 64 of the housing 44 of the master cylinder.

It should be realized that if the pistons 60 are being simultaneously moved, as by the application of pressure on the common brake pedal 24, by the operator of the vehicle both the pistons 60 will be translated so that both the poppets 92 will be operated as aforementioned.

With respect to the structure of FIGURE 4, the rubber column or link 118 will permit the poppets 90' to be tilted by the stems 92' similarly as would the springs 94 allow the tilting of the poppets 90 of FIGURE 2.

Having fully described an operative construction of my invention it is now desired to provide a well-graduated scope of protection by the appended claims.

I claim:
1. In a master cylinder housing having first and second operable piston means for developing separate pressures for separate fluid outlets from said housing, a means to equalize the pressures delivered through said separate outlets, said means comprising:
    passage means opening to chambers controlled by said first and second piston means;
    valve means in said passage means biased to close communication of said chambers therethrough; and
    mechanical means affixed to each of said first and second pistons to open said valve means upon movement of said first and second piston means to equalize pressures in said chambers.
2. A master cylinder comprising:
    a housing having first and second bores opened at one end and communicated by passage means at another end;
    first and second valve means in said passage means to normally prevent fluid communication of said first and second bores;
    first and second piston means in said first and second bores, said first and second piston means each including means operatively connected to said first and second valve means; and
    means to collectively and independently operate said first and second piston means to in the first instance open both said first and second valve means and in the latter instance open one of said first and second valve means in accordance with which of said first and second piston means is being operated.
3. A master cylinder according to claim 2 wherein said means operatively connected to said first and second valve means comprises:
    caged spring assemblies affixed to said first and second piston means and resiliently positioned in said first and second bores.
4. A master cylinder according to claim 3 wherein said first and second valve means includes each a stem respectively projecting into said first and second bores to be operatively related to said caged spring assemblies of said first and second piston means, said stems being affixed to valve poppets biased to close openings leading from said first and second bores to said passage means.
5. A master cylinder according to claim 4 wherein said poppets are connected by a deformable resilient member in said passage means which not only biases said poppets to close but is volumetrically compressible to permit thermal expansion of fluid in said passage means.
6. A master cylinder according to claim 5 wherein said member comprises a column of rubber bendable and compressible which is snap fitted at each end to said poppets.
7. A master cylinder according to claim 2 and further comprising relief valve means in said passage means adapted to open said passage means to a reservoir or fluid for said master cylinder.
8. The structure of claim 1 wherein said valve means includes a resilient link between valve poppets in said passage means biasing said poppets to maintain integrity of said chambers and volumetrically compressible to permit thermal expansion in said passage means.
9. The structure of claim 1 wherein said mechanical means includes caged spring assemblies affixed to each of said first and second pistons and linked to said housing in said chamber by return springs for each of said first and second pistons.

References Cited
UNITED STATES PATENTS 3,345,112  10/1967  Kershner _____ 60—54.5

MARTIN P. SCHWADRON, *Primary Examiner.*

ROBERT R. BUNEVICH, *Assistant Examiner.*

U.S. Cl. X.R.

188—152